Figure 1:
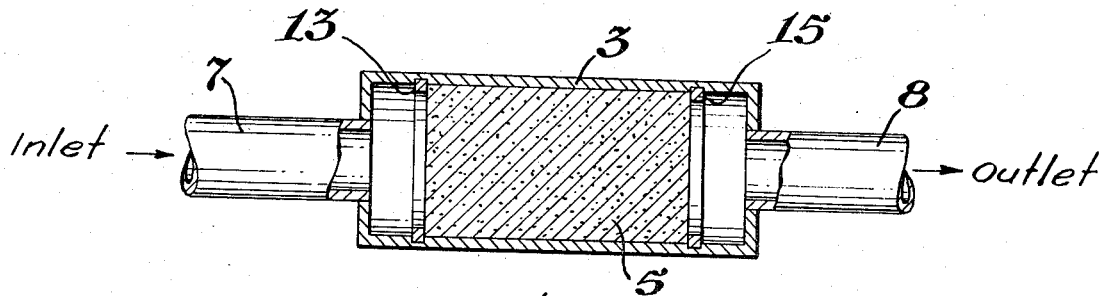

United States Patent

[11] 3,548,880

| [72] | Inventor | Melvin F. Katzer<br>Danville, Calif. |
|---|---|---|
| [21] | Appl. No. | 683,753 |
| [22] | Filed | Oct. 11, 1967 |
| | | Division of Ser. No. 442,718, Mar. 25, 1965, Patent No. 3,371,714. |
| [45] | Patented | Dec. 22, 1970 |
| [73] | Assignee | The Dow Chemical Company<br>Midland, Mich.<br>a corporation of Delaware |

[54] ADJUSTABLE POROUS BED DEVICE
2 Claims, 2 Drawing Figs.

| [52] | U.S. Cl. | 138/43 |
|---|---|---|
| [51] | Int. Cl. | F15d 1/00 |
| [50] | Field of Search | 138/40- |
| | | —43, 46; 166/91; 210/33, 189; 251/118, 121 |

[56] References Cited
UNITED STATES PATENTS

| 1,330,420 | 2/1920 | Auberschek | 138/41UX |
|---|---|---|---|
| 1,497,197 | 6/1924 | Schroder | 138/40UX |
| 1,572,469 | 2/1926 | De Lin | 138/40UX |
| 2,034,750 | 3/1936 | Deming | 138/41UX |
| 3,027,746 | 4/1962 | Kappel | 138/40X |

*Primary Examiner*—Laverne D. Geiger
*Assistant Examiner*—Edward J. Earls
*Attorneys*—Griswold and Burdick, William R. Norris and Theodore Post

ABSTRACT: A device wherein a liquid is constrained to flow through a porous bed of particulate matter and wherein the length of such porous bed traversed by the liquid is adjustable by means of an open-topped, movable sleeve member containing the particulate matter. The device is particularly useful for decreasing the pressure in a flowing polymer solution with minimal degradation of the polymer.

PATENTED DEC 22 1970

3,548,880

INVENTOR.
Melvin F. Katzer
BY
William R. Norris
ATTORNEY 3,548,880

ADJUSTABLE POROUS BED DEVICE

CROSS-REFERENCE TO RELATED APPLICATION

This application is a division of applicant's copending application, Ser. No. 442,718, filed Mar. 25, 1965, now U.S. Pat. No. 3,371,714.

DESCRIPTION OF THE INVENTION

The present invention concerns maintaining the effectiveness of polymers in solution. More particularly the invention concerns a method and related apparatus for minimizing the molecular degradative effects of reducing the pressure on a polymer solution.

Occasionally a polymer solution is subjected to a high pressure and in using the solution it becomes necessary to reduce the pressure. Techniques for reducing the pressure on fluids, especially liquids are well known. They include throttling the liquid through an orifice or any convenient valve. It has been discovered, however, that regardless of whether an orifice, nozzle, or adjustable valve such as a gate, globe, angle, spiral or pinch valve is used in reducing the pressure on a polymer solution, degradation of dissolved polymer results when the pressure of the solution is decreased significantly across the pressure reducing device. This degradation is evidenced by a viscosity loss in the polymer solution. Degradation of the polymer can adversely affect its usefulness as a mobility control agent in a water flooding medium for the secondary recovery of oil. In other applications, the degraded polymer is less efficient as a thickener or flocculating agent.

In accordance with the invention, it has been discovered that the problem of molecular degradation, or viscosity loss, as the result of pressure reduction on a solution of the polymer, can be substantially obviated by flowing the polymer solution to be depressurized through a liquid permeable, porous-bed of sufficient length to achieve a desired pressure reduction. While the invention is not predicated upon an explanation of this effect, it is believed the decrease in the pressure gradient in the direction of solution flow through the porous-bed is responsible for the improved viscosity retention.

The porous-bed may be of consolidated particulate matter such as a sandstone or frits or simply loose particulate solids such as sand, glass beads, finely divided minerals and the like held in place with suitable retaining means. Porous-beds suitable for use herein can also be prepared as coarse fiber plugs of materials such as minerals, glass or metal, natural and synthetic polymers and the like. For most applications the porous-bed will be at least 1 inch, preferably at least 3 inches, long.

Although it is not restricted thereto, the present invention finds a most useful application in the reduction of pressure on aqueous solutions of high molecular weight, water soluble polyelectrolytes. By high molecular weight is meant 1 million or more.

The invention is illustrated in the attached drawings, in which FIG. 1 is a sectional elevation of one embodiment of the invention utilizing a porous-bed of consolidated sand, otherwise termed a sand core.

Figure 2:
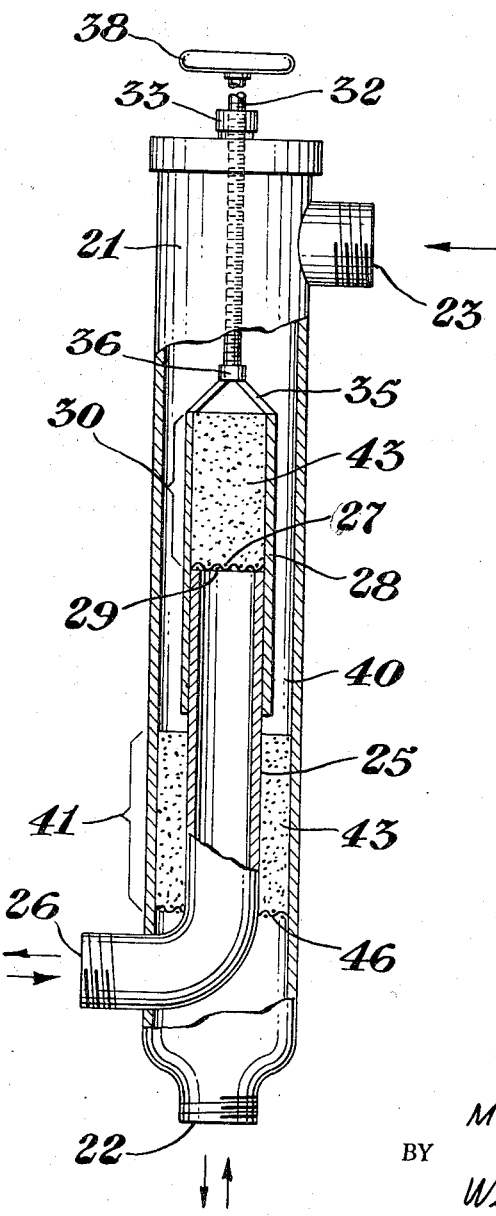

FIG. 2 is a sectional elevation of a second embodiment of the invention having an adjustable porous-bed of unconsolidated sand.

Specifically, the embodiment shown in FIG. 1 consists of a valve housing 3 in the form of a cylindrical conduit which has an entering liquid feed line 7 and a discharge liquid line 8. Sealed within the valve housing 3 is a porous-bed in the form of a sand core 5 of consolidated sand, viz., sandstone. The essential requisites of the porous-bed are insolubility in and permeability to the liquid on which pressure reduction is desired. These conditions are, of course, satisfied for most applications involving aqueous liquids by sandstone. The consolidated sandstone core 5 is held in place within the valve housing 3 by means of retaining O-rings 13 and 15. These also aid in sealing the core 5 within the valve housing 3 to prevent liquid bypassing of the core 5.

When polymer solution under high pressure is flowed through an assembly such as that shown in FIG. 1, there is a decrease in the pressure on the polymer solution. At a given liquid flow rate, the pressure decrease achieved is in proportion to the length of the sandstone core 5. Such pressure reduction is achieved without significant loss in the viscosity of the polymer solution. The term "viscosity" as applied herein to soluble e.g., water-soluble polymers, is considered to be a measure of polymer molecular weight.

The embodiment of the invention shown in FIG. 2 consists of a housing conduit in which a porous-bed of adjustable length composed of unconsolidated particulate matter occupies a portion of the liquid flow path through the housing. Thus the pressure drop at a given flow rate can be increased or decreased within the limits of the extensibility of the porous-bed.

The illustrated pressure reducing device consists of a housing conduit 21 in the form of a cylinder with spaced apart inlet ports 23 and 22. Within the interior of the housing conduit 21 is a porous-bed, base conduit 25. The inlet end 29 of the base conduit 25 is covered by a porous-bed, retaining screen cross member 27. This supports a porous-bed 30. The porous-bed base conduit 25 discharges through the wall of the housing conduit 21 at port 26. At the inlet 29 of the porous-bed base conduit 25 is an extensible sleeve 28. This slidably engages the outer surface of the porous-bed, base conduit 25. To the extent the brim of sleeve 28 extends above the inlet 29 of the porous-bed, base conduit 25, it provides an adjustable mold form for the porous-bed 30.

The sleeve 28 is moved in or out to adjust the depth of the porous-bed 30 by means of a screw 32 acting through a threaded packing nut 33. The screw 32 is coupled by means of a rotatable coupling 36 to a yoke 35 which in turn is fastened to the sleeve 28. The screw 32 is rotated to extend or collapse the porous-bed 30 by means of a wheel 38. Optionally, any means for achieving linear displacement of the sleeve 28 from without the valve housing conduit 21 can be used.

The porous-bed 30 within the sleeve 28 is constituted by an unconsolidated, insoluble particulate matter such as silica sand and any other finely divided material insoluble in the liquid on which pressure is to be reduced. In the valve housing conduit 21 is enough sand 43 to occupy the volume of the porous-bed 30 as defined by the sleeve 28, when it is fully extended in relation to the porous-bed, base conduit 25. The sand 43 is kept within the valve housing 21 by means of a retaining screen 46.

To operate the described adjustable valve in the preferred manner, it is placed in an upright position, as shown, and the sleeve 28 is extended to provide any desired porous-bed 30 depth. A fluid is then passed through the valve assembly entering through port 22 and discharging through port 26. The fluid may be a gas, or a liquid, such as that on which the pressure is to be reduced. This fluidizes the sand 43 from its position of natural repose in the annulus 40 and, to the extent required, the sand flows into and fills the porous-bed 30 from the retaining screen 27 to, or slightly above, the brim of the sleeve 28.

Once the porous-bed 30 has been established, fluid on which the pressure is to be reduced is flowed into the valve housing 21 through port 23. Although good depressurization can be achieved by continuing the fluid flow through port 22, fluid entering port 23 enters the valve housing 21 above the level of the sand 43 in the annulus 40 thereby avoiding continuously fluidizing the same. The liquid then flows through the porous-bed 30 of sand and ultimately discharges from the valve through port 26 at a pressure lower than inlet pressure.

If it is desired to decrease the pressure drop at a certain flow rate, the sleeve 28 is depressed by turning the screw 32. The flow path of the liquid through the porous-bed 30 is decreased and, thus, the pressure drop is decreased. An alternate mode of operation achieves a pressure drop across the annular porous-bed 41. In this method, the liquid to be depressurized enters port 23 and exits at port 22.

An important advantage of the pressure reducing device described above is its adaptability to back flushing to minimize pressure drop transients due to gradual plugging or settling in the porous-bed 30.

For instance, in the pressure reducing device illustrated in FIG. 2, a fluid, which may either be a gas or liquid, is flowed into the valve housing 21 through port 26 and withdrawn through port 22. When sufficient pressure is applied, complete displacement of the particulate matter from the porous-bed 30 is achieved. The valve is then ready for re-establishment of the porous-bed 30.

Although the invention was first designed as a pressure reducing device to carry out the pressure reducing process of the invention, the apparatus shown in FIG. 2 is manifestly useful as a fluid filter or fluid mixer. The latter function is achieved by feeding fluids of different composition simultaneously through ports 22 and 23. Whenever the porous-bed which may be serving as a filter or means of mixing fluids becomes plugged, the filter bed can be reconstituted as described above.

Pressure reduction on a polymer solution, such as can be achieved under the invention, is useful in the secondary recovery of oil by flooding an oil bearing formation with an aqueous polymer solution. For convenience the polymer solution is made up and pressurized at a centrally located pumping station. From the central source of supply, the polymer solution is distributed throughout the oil field through main transmission lines and into a number of injection wells through spur feeder lines. The pressure at a particular injection well head will often desirably be substantially less than the available pressure in the main line. As a result, it is necessary to reduce the pressure on the polymer solution. Manifestly, this pressure reduction can be advantageously accomplished under the invention with minimum degradation of the polymer in solution and thus minimum loss of ability to control mobility of the injection fluid.

Since the molecular degradation problem is most aggravated in instances of high molecular weight, soluble, linear polymers, e.g., having molecular weights of a million and above, it is manifest that the invention becomes more valuable in its application to such polymers.

Polymers discovered to undergo molecular degradation as a result of being subjected to sharp pressure gradients, i.e., pressure reduction over short flow paths such as occurs in conventional valves and orifices, include the water soluble polyelectrolytes such as polyacrylamide copolymers of acrylamide and acrylic acid, polystyrene sulfonate, polyvinylalcohol and polyethylene oxide. Similarly all polymers soluble in organic solvents such as polystyrene, polyvinyl toluene, polymethylmethacrylate and the like can be expected to undergo shear degradation when subjected to sharp pressure gradients. In general, polymers obtained by the polymerization of monoethylenically unsaturated monomers to provide essentially linear, soluble polymers are most subject to molecular degradation as a result of large pressure gradients.

By way of specifically illustrating the invention, a 1.25 inch, schedule 80 steel pipe 12 inches long was packed with silica sand to form a liquid permeable porous-bed. Stainless steel retainer screens were rigidly secured in front and in back of the porous-bed.

A 0.05 percent by weight solution of an acrylamide polymer having a molecular weight of about 2 million was flowed through the bed in a series of increasing flow rates which resulted in a corresponding series of increasing pressure drops. The viscosity of the polymer solution was determined before and after passing the solution through the porous-bed.

It was discovered in this manner that at a pressure gradient of 300 lbs./sq. in. per linear foot of sand bed, the viscosity loss of the polymer solution was only 0.03 centipoise. In this particular porous-bed, a pressure gradient of 1,000 lbs./sq. in. per linear foot caused a viscosity loss of 6.16 centipoise.

In further demonstrations of the invention, conducted in a manner similar to that of the foregoing, except that porous-beds of 9 inches, 6 inches, and 3 inches in length were used, it was discovered that molecular degradation, as evidenced by solution viscosity losses, is controlled by the magnitude of the pressure gradient and is essentially independent of bed length, except in so far as this dimension of the bed affects the pressure gradient.

In comparing conventional pressure reducing valves with the invention, it was found that a pressure drop of 300 lbs. per square inch across a 1 inch gate valve induced a viscosity loss in the same polymer solution of about 0.25 centipoise and that pressure drop of 1,000 lbs./sq. in. across the same valve caused a viscosity loss of about 0.45 centipoise.

Benefits similar to those achieved above with aqueous polymer solutions can also be achieved by reducing the pressure on solutions of polymers in organic solvents over an extended pressure gradient in accordance with the invention.

In addition to adjusting the length of the porous-bed, the pressure gradient, or pressure change per unit of distance in the direction of flow, can also be regulated by adjusting the liquid permeability of the porous-bed. For example, by increasing the particle size of matter used for the porous-bed, its permeability is increased and thus the pressure reduction gradient is decreased. For a given flow rate, the pressure reduction gradient is also decreased by increasing the cross-sectional area of the porous-bed. It is preferred to keep the pressure reduction gradient below about 1,200 lbs. per square inch per linear foot in any particular porous-bed. In any event, the lower the pressure gradient through the porous-bed, the less polymer degradation occurs.

I claim:

1. An apparatus which comprises a porous-bed of particulate matter, a housing conduit having at least one inlet and an outlet for flowing liquid, within which housing conduit there is positioned a base conduit having its outer dimensions smaller than the inner dimensions of said housing conduit and having a porous-bed retaining screen cross member, said member covering the cross-sectional area within the base conduit, one end of said base conduit discharging through the wall of the housing conduit and the other end slidably engaging an open-topped, adjustable sleeve, said sleeve being adapted to receive particulate matter through the open top thereof to form said porous-bed, and means for displacing said sleeve in sliding engagement with said base conduit to vary the length of porous-bed presented to the liquid.

2. An apparatus as in claim 1 wherein the housing contains sufficient particulate matter to occupy the porous-bed defined within the assembly of the base conduit with retaining screen cross member and porous-bed length adjusting sleeve when the sleeve is fully extended in relation to the base conduit, and having a secondary inlet below the position of natural repose for the particulate matter within the housing conduit.

PO-1050
(5/69)

UNITED STATES PATENT OFFICE
CERTIFICATE OF CORRECTION

Patent No. 3,548,880        Dated    22 December 1970

Inventor(s)    Melvin F. Katzer

It is certified that error appears in the above-identified patent and that said Letters Patent are hereby corrected as shown below:

In column 4, line 9, delete "6.16" and insert -- 0.16 --.

Signed and sealed this 20th day of April 1971.

(SEAL)
Attest:

EDWARD M. FLETCHER, JR.                    WILLIAM E. SCHUYLER
Attesting Officer                          Commissioner of Pat